United States Patent
Dolgunov et al.

(10) Patent No.: US 8,130,950 B2
(45) Date of Patent: Mar. 6, 2012

(54) CONFIGURABLE RANDOM NUMBER GENERATOR

(75) Inventors: Boris Dolgunov, Ramat Gan (IL); Leonid Minz, Beersheba (IL); Roy Krotman, Rishon Lezion (IL); Itai Dror, Omer (IL); Michael Kun, Ashdod (IL)

(73) Assignee: SanDisk IL Ltd., Kfar Saba (IL)

( * ) Notice: Subject to any disclaimer, the term of this patent is extended or adjusted under 35 U.S.C. 154(b) by 532 days.

(21) Appl. No.: 12/260,629

(22) Filed: Oct. 29, 2008

(65) Prior Publication Data

US 2009/0110188 A1   Apr. 30, 2009

(30) Foreign Application Priority Data

Oct. 30, 2007   (IL) .......................................... 187035

(51) Int. Cl.
*H04L 9/00* (2006.01)
(52) U.S. Cl. ........................... 380/46; 708/250; 708/251
(58) Field of Classification Search .................... 380/46, 380/28; 708/250, 251
See application file for complete search history.

(56) References Cited

U.S. PATENT DOCUMENTS

| | | | |
|---|---|---|---|
| 4,799,259 | A | 1/1989 | Ogrodski |
| 4,905,176 | A | 2/1990 | Schulz |
| 6,240,432 | B1 | 5/2001 | Chuang et al. |
| 6,253,223 | B1 | 6/2001 | Sprunk |
| 6,807,553 | B2 | 10/2004 | Oerlemans et al. |
| 7,028,059 | B2 | 4/2006 | Williams et al. |
| 7,575,165 | B2 * | 8/2009 | Villard et al. ................. 235/435 |
| 2005/0129247 | A1 * | 6/2005 | Gammel et al. ............. 380/286 |
| 2006/0015624 | A1 | 1/2006 | Smith et al. |
| 2006/0173943 | A1 | 8/2006 | Luzzi et al. |
| 2007/0210923 | A1 * | 9/2007 | Butler et al. ................ 340/572.8 |
| 2008/0180249 | A1 * | 7/2008 | Butler et al. ................ 340/572.1 |

FOREIGN PATENT DOCUMENTS

| | | |
|---|---|---|
| EP | 1 253 513 | 10/2002 |
| EP | 1686458 | 8/2006 |
| JP | 2003 036168 | 2/2003 |

OTHER PUBLICATIONS

Soubusta Jet al., "Quantum random number generator", Proc. of the SPIE, Bellingham, VA, US, vol. 4356, Jan. 1, 2001, pp. 54-60.
Markus Dichtl, et al., "High-speed true random number generation with logicgates only", Cryptographic Hardware and Embedded Systems—Ches 2007; Springer Berlin, vol. 4727, Sep. 10, 2007, pp. 45-62.
Marco Bucci, et al., "Design of testable random bit generators", Cryptographic Hardware and Embedded Systems—Ches 2005 Lecture Notes in Computer Science; Springer Berlin, vol. 3659, Jan. 1, 2005, pp. 147-156. Wilson D G et al., "Integrated RF receiver front ends and frequency synthesizers for wireless", Jan. 1, 1996, pp. 369-396.
Invitation to Pay Additional Fees, and, Where Applicable, Protest Fee for PCT/IL2008/001383, dated Mar. 4, 2009, 10 pages.
International Preliminary Report on Patentability for PCT/IL2008/001383, dated May 14, 2010, 12 pages.

\* cited by examiner

*Primary Examiner* — Kambiz Zand
*Assistant Examiner* — Abiy Getachew
(74) *Attorney, Agent, or Firm* — Brinks Hofer Gilson & Lione

(57) ABSTRACT

A method for random number generation includes generating random number sequences using a Random Number 5 Generator (RNG) circuit having an externally-modifiable configuration. The RNG circuit generates a first random number sequence having a first measure of randomness, and modifies the configuration of the RNG circuit, causing the RNG circuit to generate a second random number sequence having a second measure of the randomness, indicating a degree of the randomness that is no less than the first measure.

18 Claims, 3 Drawing Sheets

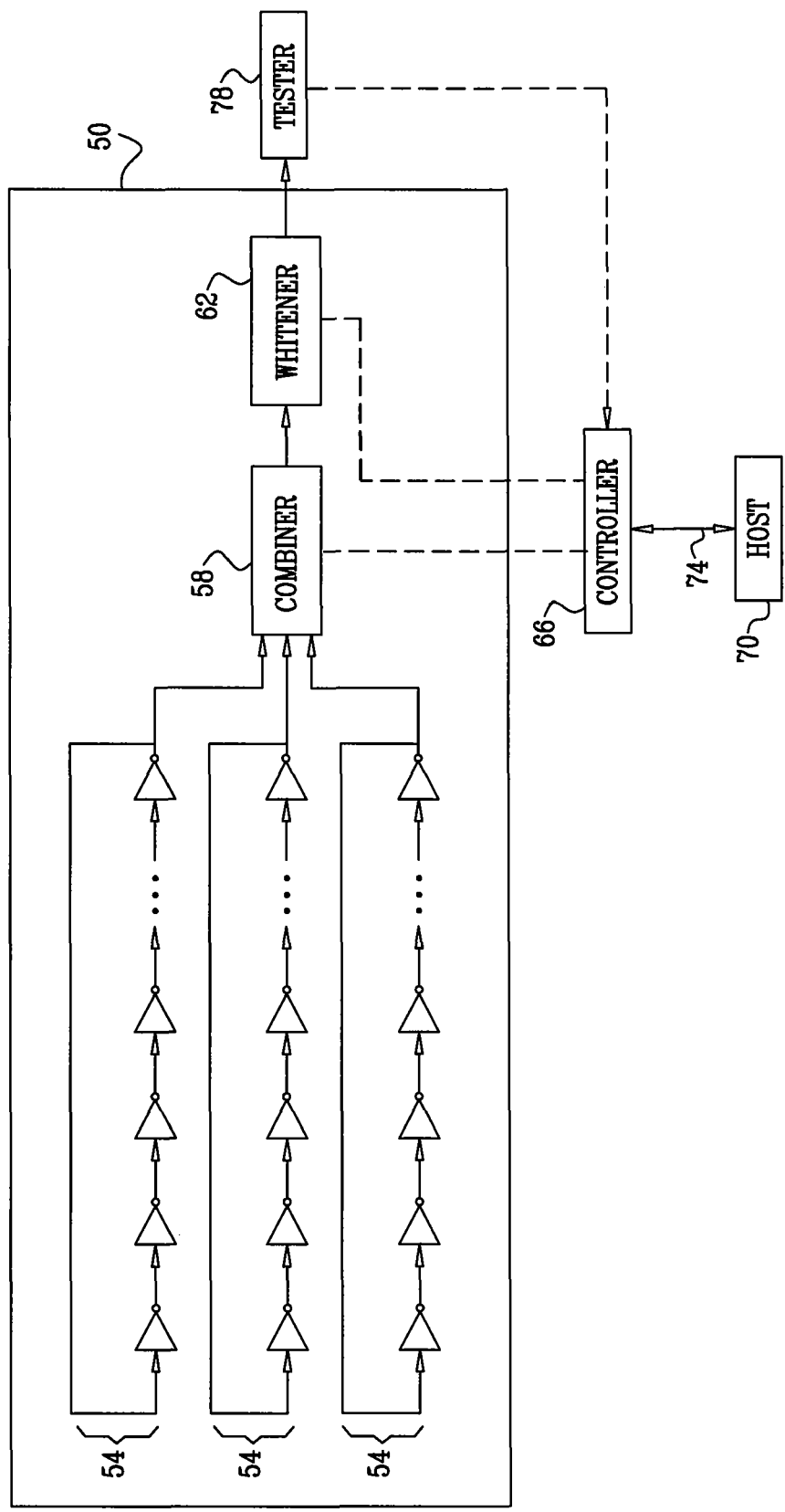

CONFIGURABLE RANDOM NUMBER GENERATOR

FIELD OF THE INVENTION

The present invention relates generally to random number generation, and particularly to methods and systems for reconfiguration of Random Number Generator (RNG) circuits.

BACKGROUND OF THE INVENTION

Random Number Generation (RNG) processes are used in a wide variety of applications, such as in cryptography systems and computer simulations. Some RNG circuits are analog, in which randomness is typically introduced by a randomly-varying physical characteristic of an analog electronic component. Other RNG circuits are fully-digital.

SUMMARY OF THE INVENTION

Embodiments of the present invention provide a system for random number generation, including:

a Random Number Generator (RNG) circuit, which is configured to generate random number sequences in accordance with an externally-modifiable configuration; and a control unit, which is configured, when the RNG circuit generates a first random number sequence having a first measure of randomness, to modify the configuration of the RNG circuit so as to cause the RNG circuit to generate a second random number sequence having a second measure of the randomness, which indicates a degree of the randomness that is no less than the first measure.

In some embodiments, the control unit is configured to process the first random number sequence so as assess the first measure of the randomness, and to modify the configuration responsively to the assessed first measure of the randomness. In another embodiment, the control unit is configured to accept an external command and to modify the configuration responsively to the external command. The control unit may be configured to modify the configuration periodically. Additionally or alternatively, the control unit may be configured to modify the configuration by randomly selecting a modified configuration from a set of possible configurations.

In a disclosed embodiment, the RNG circuit includes at least one ring oscillator having configurable feedback taps, and the control unit is configured to modify the configuration by reconfiguring the feedback taps. In another embodiment, the RNG circuit includes multiple cascaded inverters arranged in a ring, and the control unit is configured to modify the configuration by modifying a number of the inverters in the ring. Additionally or alternatively, the RNG circuit includes multiple oscillators producing respective multiple outputs, and a combining module, which combines the multiple outputs in accordance with a combining function to produce the random number sequences, and the control unit is configured to modify the configuration by modifying the combining function.

In yet another embodiment, the RNG circuit is configured to apply a whitening function to the random number sequences, and the control unit is configured to modify the configuration by modifying the whitening function. In still another embodiment, the RNG circuit is configured to generate the random number sequences responsively to one or more initial values, and the control unit is configured to modify the configuration by modifying the initial values. In some embodiments, the RNG circuit is fully-digital.

There is additionally provided, in accordance with an embodiment of the present invention, a method for random number generation, including:

generating random number sequences using a Random Number Generator (RNG) circuit having an externally-modifiable configuration; and when the RNG circuit generates a first random number sequence having a first measure of randomness, causing the RNG circuit to generate a second random number sequence having a second measure of the randomness, which indicates a degree of the randomness that is no less than the first measure, by modifying the configuration of the RNG circuit.

There is further provided, in accordance with an embodiment of the present invention, a cryptography apparatus, including:

a cryptography module, which is coupled to carry out a cryptographic operation on data using the random number sequences; and a random number generation module, including:

a Random Number Generator (RNG) circuit, which is configured to generate the random number sequences in accordance with an externally-modifiable configuration; and a control unit, which is configured, when the RNG circuit generates a first random number sequence having a first measure of randomness, to modify the configuration of the RNG circuit so as to cause the RNG circuit to generate a second random number sequence having a second measure of the randomness, which indicates a degree of the randomness that is no less than the first measure.

There is also provided, in accordance with an embodiment of the present invention, a memory storage apparatus, including:

a memory;

a cryptography module, which is coupled to carry out a cryptographic operation on data exchanged with the memory using the random number sequences; and a random number generation module, including:

a Random Number Generator (RNG) circuit, which is configured to generate the random number sequences in accordance with an externally-modifiable configuration; and a control unit, which is configured, when the RNG circuit generates a first random number sequence having a first measure of randomness, to modify the configuration of the RNG circuit so as to cause the RNG circuit to generate a second random number sequence having a second measure of the randomness, which indicates a degree of the randomness that is no less than the first measure.

The present invention will be more fully understood from the following detailed description of the embodiments thereof, taken together with the drawings in which:

BRIEF DESCRIPTION OF THE DRAWINGS

FIG. 3 is a block diagram that schematically illustrates an externally-configurable RNG, in accordance with an alternative embodiment of the present invention.

DETAILED DESCRIPTION OF EMBODIMENTS

Overview

Figure 1:
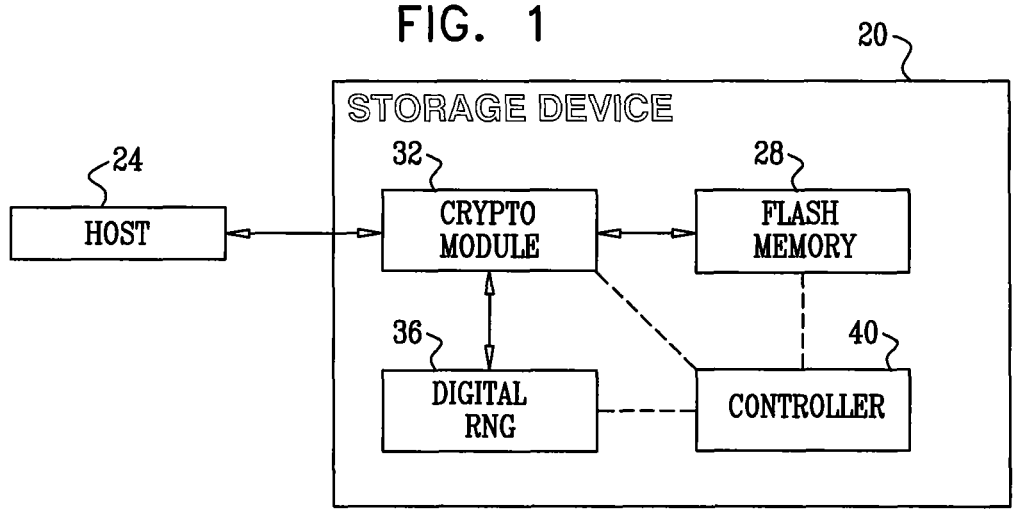
FIG. 1 is a block diagram that schematically illustrates a data storage device, in accordance with an embodiment of the present invention.

Embodiments of the present invention provide improved methods and circuits for generating sequences of random numbers. In some embodiments, a fully-digital Random Number Generator (RNG) circuit generates sequences of random numbers. The RNG circuit has a configuration that is externally-modifiable at run-time, i.e., during operation of the circuit. The configuration has an effect of the level of randomness of the number sequences the RNG circuit produces. A control circuit modifies the configuration of the RNG circuit at run-time, so as to improve the level of randomness of the generated random number sequences.

Several exemplary RNG circuits and configuration modification schemes are described herein. For example, the RNG circuit may comprise a ring oscillator having feedback taps that can be switched on and off. Another exemplary RNG circuit comprises multiple ring oscillators whose outputs are combined using a combination function. Modifying the combination function modifies the level of randomness of the combined sequence. Additionally or alternatively, the random number sequence produced by the RNG circuit may be further randomized by a whitening function, which can be modified or adapted at run-time. Some components of the RNG circuit may assume certain initial states or values after initialization or reset. These values can also be modified to produce random number sequences having better randomness.

The controller may modify the RNG circuit configuration in response to various events or conditions. For example, the configuration can be modified after initialization, at periodic intervals or in response to an external command. In some embodiments, an external tester measures the level of randomness in the random number sequences produced by the RNG circuit, and provides feedback to the controller. The controller modifies the RNG circuit configuration based on the feedback.

RNG circuits whose level of randomness can be controlled at run-time are advantageous in a number of scenarios. In many cases, it is difficult to predict and maintain the level of randomness of RNG circuits in mass production processes. For example, a well-known problem of known digital RNG circuits is their sensitivity to unit-to-unit variations in the manufacturing process. Since the RNG circuits described herein can be reconfigured at run-time, they can be tested after production, e.g., when operating in a host system, so as to produce the desired level of randomness.

Additionally, known digital RNG circuits are often difficult to port from one semiconductor technology or manufacturing process to another. The RNG circuits described herein, on the other hand, are process-independent. In other words, when using the on-line reconfiguration capability of the RNG circuits described herein, a certain generic circuit design can be ported across different manufacturing processes and device technologies without compromising performance. This feature considerably reduces development and technology migration costs. The on-line reconfiguration capability also increases the likelihood that an RNG design that was designed and simulated in software will provide the expected performance when implemented in hardware.

Moreover, some known digital RNG circuits tend to wake-up in similar initial states following power-up or reset, an effect that further reduces their level of randomness. When using the externally-modifiable RNG circuits described herein, on the other hand, the controller is able to modify the initial parameters of the RNG circuit, either after power-up or reset, or periodically.

Thus, the methods and systems described herein provide RNG circuits that achieve higher levels of randomness in comparison with known circuits. Encryption devices that use the disclosed RNG circuits are typically better suited to current encryption standards and are less vulnerable to side channels attacks and other unauthorized decoding attempts in comparison with encryption devices using conventional RNG circuits.

Although the embodiments described herein mainly address cryptography and data storage applications, the principles of the present invention can be used in other applications that involve random number generation, such as in secure communication, computer simulations, computer games, and many others.

System Description

FIG. 1 is a block diagram that schematically illustrates a data storage device 20, in accordance with an embodiment of the present invention. Device 20 typically comprises a removable storage device such as a Disk-on-Key, memory card or smartcard, but may generally comprise any other suitable device type. Device 20 communicates with a host 24, which may comprise, for example, a computing device, a digital camera, a mobile phone, or any other suitable host system that stores data. Host 24 sends data for storage to device 20, and retrieves data that is stored in the storage device. Storage device 20 comprises a memory 28, in the present example comprising a Flash memory. In alternative embodiments, memory 28 may comprise any other suitable type of volatile or non-volatile memory.

A cryptographic module 32 carries out cryptographic operations on data that is written into and read out of memory 28, as well as on data that is exchanged with host 24. For example, module 32 may apply operations such as data encryption, decryption, electronic signing and/or signature verification. Module 32 may apply any suitable cryptography algorithm, such as, for example, Data Encryption Standard (DES), Triple-DES (3-DES), Rivest, Shamir and Adleman (RSA), Advanced Encryption Standard (AES), and/or any other suitable cryptographic process, for carrying out cryptographic operations.

The cryptographic processes carried out by module 32 use sequences of random numbers, which are produced by a Digital Random Number Generator (DRNG) circuit 36. In many cases, the quality and strength of the cryptographic operations depend on the level of randomness of the number sequences produced by RNG circuit 36. In the context of the present patent application and in the claims, the terms "level of randomness" and "measure of randomness," which are used interchangeably, refer to any quantitative measure that is indicative of the unpredictability of the values of the random number sequences. The level of randomness may also indicate the decorrelation of one part of the random number sequence from other parts of the sequence.

The level of randomness can be expressed, for example, by the entropy per output bit of the number sequence, which is given by $$H(p) = -\sum_{i=1}^{\infty} \frac{1}{p_i} \log \frac{1}{p_i}$$

wherein i runs over the bits in the sequence, and $p_i$ denotes the probability of the i'th bit in the sequence assuming the value p. The entropy per bit can be estimated in a number of ways, by measuring the statistical properties of the sequence. Several exemplary methods, standards and test suites for measuring the statistical properties of random number sequences and for assessing their level of randomness are described below.

RNG circuit 36 is controlled by a controller 40, which also controls and manages the operation of the other components of storage device 20. The RNG circuit has an externally-modifiable configuration, which affects the randomness of the random number sequences it produces. Controller 40 modifies the configuration of the RNG circuit, using methods that are described in detail further below, in order to increase the level of randomness of the random number sequences produced by the RNG circuit.

Cryptographic module 32, RNG circuit 36 and controller 40 are typically implemented in hardware, such as in one or more Application-Specific Integrated Circuits (ASICs) or Field-Programmable Gate Arrays (FPGAs). Controller 40 may be implemented in hardware or firmware, and/or using software running on a suitable processor.

Exemplary RNG Configurations

Figure 2A:
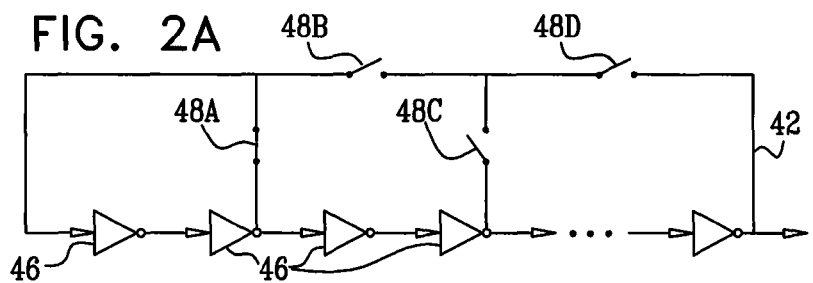
FIGS. 2A-2C are block diagrams that schematically illustrate an externally-configurable Random Number Generator (RNG), in accordance with an embodiment of the present invention.
Figure 2B:
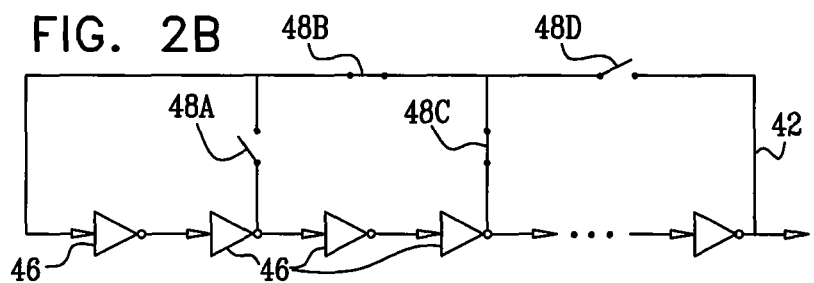
Figure 2C:
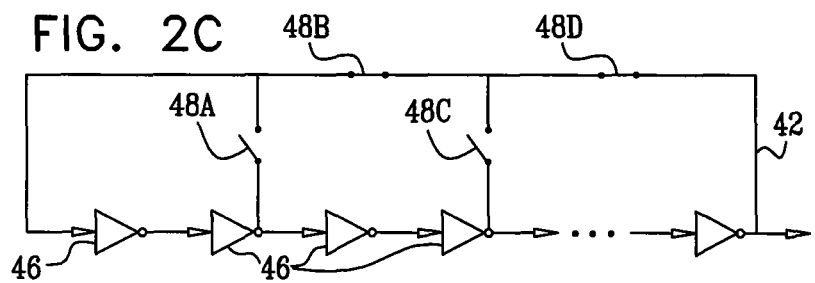

FIGS. 2A-2C are block diagrams that schematically illustrate an externally-configurable Random Number Generator (RNG) 42, in accordance with an embodiment of the present invention. The configuration of RNG 42 can be used, for example, for implementing RNG 36 of FIG. 1 above. RNG 42 comprises a ring oscillator, i.e., an odd number of logical inverters 46, which are connected in circular cascade to form a ring. The output of the RNG oscillates between two logical levels (denoted "1" and "0"), thus producing a binary number sequence. The frequency of oscillation is generally determined by the number of inverters 46 and the delay of each inverter. As is well known in the art, phase jitter of inverters 46 causes the binary number sequence to have random characteristics.

The ring oscillator comprises one or more feedback connections, referred to as taps. Each feedback tap connects the output of a certain inverter 46 to the input of a certain inverter in the ring. One or more of the feedback taps can be switched on and off using external means. In the present example, circuit 42 comprises four switches 48A ... 48D, which can be switched on and off by controller 40. Each particular setting of switches 48A ... 48D is referred to as a configuration of the RNG. As can be appreciated, modifying the RNG configuration typically modifies the level of randomness of the random number sequences at the RNG output.

In some embodiments, the ring oscillator configuration can be modified by modifying the length of the ring oscillator, i.e., the number of inverters that participate in the ring. For example, the controller may bypass or deactivate one or more of the inverters.

FIGS. 2A-2C show three different configurations of RNG 42, i.e., three different settings of switches 48A ... 48D, which produce random number sequences having different randomness characteristics, and different levels of randomness.

The ring oscillators of FIGS. 2A-2C are shown as examples, which are chosen purely for the sake of conceptual clarity. In alternative embodiments, any other type of ring oscillator having any number of inverters and feedback taps can be used. In some embodiments, only a subset of the feedback taps is switchable. Alternatively, any other mechanism for modifying the ring oscillator configuration can also be used.

FIG. 3 is a block diagram that schematically illustrates an externally-configurable RNG 50, in accordance with an alternative embodiment of the present invention. RNG 50 can be used, for example, to implement RNG 36 of FIG. 1 above. RNG 50 comprises three ring oscillators 54. The outputs of oscillators 54 (i.e., the binary random number sequences produced by the individual oscillators) are combined by a combiner 58, in accordance with a certain combining function. Combiner 58 may apply various types of combining functions. For example, the combiner may perform an Exclusive-OR (XOR) operation on the three individual oscillator outputs, such that the combiner output is given by the following table:

| Oscillator 1 output | Oscillator 2 output | Oscillator 3 output | Combiner output |
|---|---|---|---|
| 0 | 0 | 0 | 0 |
| 0 | 0 | 1 | 1 |
| 0 | 1 | 0 | 1 |
| 0 | 1 | 1 | 0 |
| 1 | 0 | 0 | 1 |
| 1 | 0 | 1 | 0 |
| 1 | 1 | 0 | 0 |
| 1 | 1 | 1 | 1 |

Alternatively, the combiner may compute a majority of the oscillator outputs, such that the combiner output is given by the following table:

| Oscillator 1 output | Oscillator 2 output | Oscillator 3 output | Combiner output |
|---|---|---|---|
| 0 | 0 | 0 | 0 |
| 0 | 0 | 1 | 0 |
| 0 | 1 | 0 | 0 |
| 0 | 1 | 1 | 1 |
| 1 | 0 | 0 | 0 |
| 1 | 0 | 1 | 1 |
| 1 | 1 | 0 | 1 |
| 1 | 1 | 1 | 1 |

Further alternatively, the combiner may apply any other suitable combining function to combine the outputs of ring oscillators 54. The combining functions may be represented by tables, Boolean operations or using any other suitable representation. As can be appreciated, different combining functions generally cause the random number sequence at the combiner output to have different randomness levels. Thus, each combining function is regarded as a particular configuration of RNG 50.

The combining function applied by combiner 58 is externally-modifiable. In the present example, a controller 66 controls combiner 58 so as to modify the combining function. For example, the combiner may store two or more predefined combining functions, such as XOR and majority functions.

The controller instructs the combiner to switch from the combining function that is currently in use to a different function.

In some embodiments, the combining function may have several stages, each of which may be externally-modifiable. For example, a certain combining function may accept as input N random sequences produced by N ring oscillators. A subset of M input sequences, M<N, are combined using a first combining function. The remaining N−M input sequences are combined using a second combining function. The outputs of the first and second combining functions are combined using a third combining function, to produce the output of the combiner. One or more of the first, second and third combining functions may be externally-modifiable, so as to modify the level of randomness of the output sequence. In alternative embodiments, the combining function has one or more parameters, which can be modified.

In some cases, the random number sequence generated by the RNG has residual repetitive or predictable patterns, sometimes referred to as "colored" patterns. In some embodiments, RNG 50 applies a whitening function to the output of combiner 58, in order to further increase the level of randomness of the random number sequences. In the context of the present patent application and in the claims, the term "whitening function" refers to any function that modifies the statistical distribution of the number sequence on which it operates and increases its level of randomness.

The whitening function may increase the level of randomness, for example, by making the output bits dependent on a large number of input bits and/or by removing biases from the input sequence (e.g., by diluting the sequence. The whitening function is typically non-invertible, i.e., analysis of the output sequence provides little or no information on the input sequence.

In some embodiments, the whitening function may comprise a hashing function. Some exemplary hashing methods that may be used for whitening are the Secure Hash Algorithm 1 (SHA-1) and SHA-256 functions. Alternatively, cryptographic methods such as Advanced Encryption Standard (AES) and Data Encryption Standard (DES), as well as various other non-linear functions, can also be used for whitening.

In the example of FIG. 3, RNG 50 comprises a whitener 62, which applies the whitening function. The whitening function carried out by whitener 62 is externally-modifiable, for example by switching between different whitening functions and/or by modifying parameters of the whitening function. Modifying the whitening function typically modifies the level of randomness of the random number sequence at the output of whitener 62, and is regarded as modifying the configuration of RNG 50.

Similarly to the configuration of FIG. 1 above, controller 66 communicates with a host 70 over an interface 74. In some embodiments, RNG 50 can be connected to a tester 78, which measures or assesses the level of randomness of the RNG output. The measured randomness level can be fed back to controller 66 and used for triggering or otherwise controlling the modification of the RNG configuration.

The exemplary configuration of RNG 50 is shown purely for the sake of conceptual clarity. In alternative embodiments, other types of RNG circuits can be combined using an externally-modifiable combining function. Any desired number of RNG circuits can be combined. The output of the combiner may be provided as output without whitening.

Further alternatively, any other type of RNG can be whitened using a whitening function. For example, the output of an externally-configurable ring oscillator such as RNG 42 of FIGS. 2A-2C above can be further modified by a suitable whitening function. Similarly, any suitable type of RNG can be controlled using feedback provided from a tester, which measures the level of randomness.

Any type of RNG may have initial parameters, whose values affect the level of randomness of the output. For example, when the RNG comprises digital components such as flip-flops or registers, the initial states or values of these components (after initialization or resetting of the RNG) may affect the level of randomness. In theory, such parameters should assume random or pseudo-random values following each initialization or reset. In practice, however, the parameter values often have poor randomness. Thus, in some embodiments the controller may modify the initial values of such components, an operation which is also regarded as modifying the RNG configuration.

The exemplary RNG circuits described herein generate binary number sequences. However, the methods and systems described herein are in no way limited to binary sequences, and can be used in RNG circuits that generate sequences, whose elements are drawn from any desired alphabet.

In the different RNG types described herein, the controller may modify the configuration of the RNG in response to various events and conditions. For example, the configuration may be modified once, after the RNG is initialized and begins operating in the host system. This scheme can be used, for example, to compensate for unit-to-unit variations associated with the manufacturing process of the RNG circuit. Additionally or alternatively, the controller may modify the RNG configuration from time to time during operation, such as at periodic intervals. This mode of operation can be used to generally improve the level of randomness achieved by the RNG circuit.

Further additionally or alternatively, the controller may modify the RNG configuration in response to an external command, such as a command received from the host. Such a command may be initiated, for example, by an application or operating system of the host.

In some embodiments, the controller may modify the RNG configuration in response to feedback provided by an external tester. This mode of operation may be used, for example, in a production line that manufactures the RNG or the storage device. In these embodiments, the RNG output is provided to a tester. The tester measures the level of randomness of the random number sequence produced by the RNG. Based on the measurement, the tester provides feedback to the controller, which in turn modifies the RNG configuration in response to the feedback.

For example, the tester may compare the measured level of randomness to a threshold and report to the controller whenever the randomness level falls below the threshold. In an alternative embodiment, the tester provides the measured randomness level to the controller, and the controller decides whether or not to modify the RNG configuration. Further alternatively, any other suitable logic or criteria can be used to modify the RNG configuration based on the measured randomness level.

The tester may apply various types of statistical tests to the RNG output, in order to measure the level of randomness. Several standards and test suites for measuring the statistical properties of random number sequences and for assessing the level of randomness are known in the art. Some exemplary standards and test suites comprise the Federal Information Processing Standard 140 (FIPS 140) standard, the National Institute of Standards and Technology 800-22 (NIST 800-22) standard, the Diehard battery of tests, and various Collision tests (typically for numbers up to 128 bits long). The tester may use any suitable method, standard or test suite for assessing the level of randomness of the sequence. The statistical tests may sometimes be adaptive.

In some embodiments in which the RNG applies an externally-configurable whitening function, the storage device controller adapts or modifies the whitening function based on feedback provided by the tester, i.e., based on the measured level of randomness of the output sequence. For example, the whitening function may comprise a hashing function having two operational modes. In the first mode, the function hashes 160 input bits to produce 32 output bits. In the second mode, the function produces the 32 output bits by hashing 320 input bits, i.e., twice as many input bits in comparison with the first mode. The two operational modes provide two different trade-offs between randomness and throughput the first mode provides higher throughput than the second mode, but its level of randomness may be lower, since each output bit of the hashing function is based on a smaller number of input bits.

The storage device controller may select one of the two modes based on the measured level of randomness of the output sequence. Alternatively, any other suitable method for modifying the whitening function, so as to select the appropriate operating point in terms of performance vs. randomness level, can also be used.

In some embodiments, the configuration modification is known a-priori to increase the level of randomness. For example, when a whitening function is adapted based on the measured level of randomness, a modified whitening function that is known to cause an improvement may sometimes be computed in advance. In other scenarios, the configuration modification may change the level of randomness, but is not guaranteed to improve it. In these cases, the configuration can be repeatedly modified, e.g., chosen at random, until satisfactory performance is reached.

Random Number Generation Method Description

Figure 4:
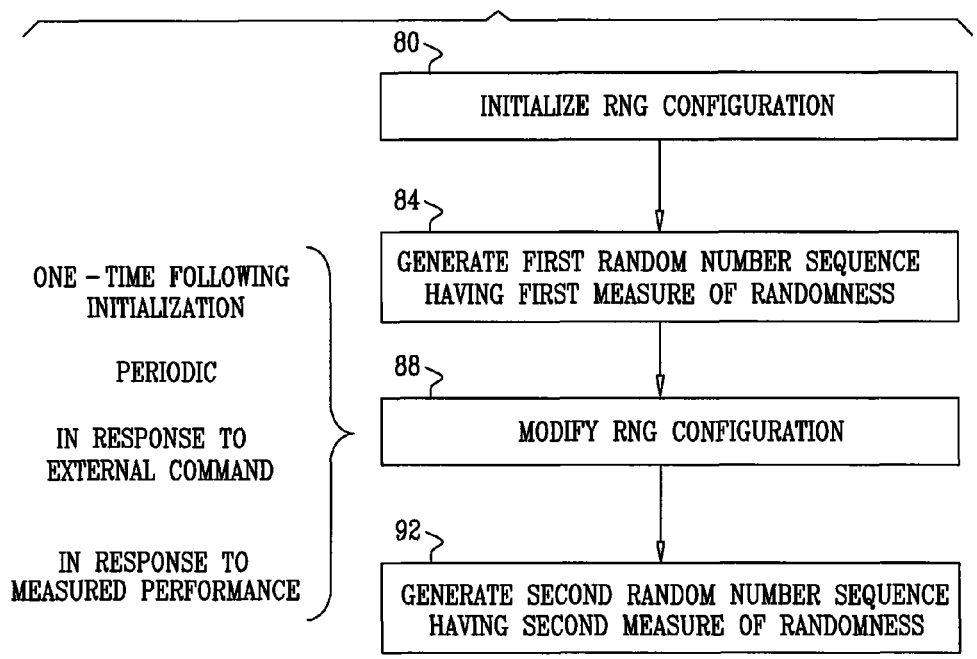
FIG. 4 is a flow chart that schematically illustrates a method for random number generation, in accordance with an embodiment of the present invention.

FIG. 4 is a flow chart that schematically illustrates a method for random number generation, in accordance with an embodiment of the present invention. The method begins with the controller initializing the RNG circuit to assume a certain initial configuration, at an initialization step 80. When configured in the initial configuration, the RNG produces a first random number sequence having a first level of randomness, at a first sequence generation step 84. The controller modifies the RNG circuit configuration at run-time, at a configuration modification step 88. As a result, the RNG produces a second random number sequence having a second level of randomness, which is no less than the level of randomness of the first sequence, at a second sequence generation step 92.

Although the embodiments described herein mainly address cryptographic applications, the principles of the present invention can be used in other applications that involve random number generation, such as in computer simulations, communication systems, computer games, and many others.

It will thus be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art.

The invention claimed is:

1. A method for random number generation in a device, the method comprising:
   in a device with a Random Number Generator (RNG) circuit having a configuration which is externally modifiable performing:
   generating a first random number sequence having a first measure of randomness according to a first summation whose argument includes a reciprocal of a first probability multiplied by a logarithm of the first probability;
   modifying the configuration of the RNG circuit; and
   generating a second random number sequence having a second measure of randomness according to a second summation whose argument includes a reciprocal of a second probability multiplied by a logarithm of the second probability, which is no less than the first measure.

2. The method according to claim 1, wherein generating the second random number sequence comprises processing the first random number sequence so as to assess the first measure of the randomness, and modifying the configuration responsively to the assessed first measure of the randomness.

3. The method according to claim 1, wherein generating the second random number sequence comprises accepting an external command and modifying the configuration responsively to the external command.

4. The method according to claim 1, wherein generating the second random number sequence comprises modifying the configuration periodically.

5. The method according to claim 1, wherein generating the second random number sequence comprises modifying the configuration by randomly selecting a modified configuration from a set of possible configurations.

6. The method according to claim 1, wherein the device comprises at least one ring oscillator having configurable feedback taps, and wherein modifying the configuration comprises reconfiguring the feedback taps.

7. The method according to claim 1, wherein the device comprises multiple cascaded inverters arranged in a ring, and wherein modifying the configuration comprises modifying a number of the inverters in the ring.

8. The method according to claim 1, wherein the device comprises multiple oscillators producing respective multiple outputs and wherein the method further comprises combining the multiple outputs in accordance with a combining function to produce the random number sequences, and wherein modifying the configuration comprises modifying the combining function.

9. The method according to claim 1, further comprising applying a whitening function to the first and second random number sequences, and wherein modifying the configuration comprises modifying the whitening function.

10. The method according to claim 1, wherein generating the first and second random number sequences comprises generating the sequences responsively to one or more initial values, and wherein modifying the configuration comprises modifying the initial values.

11. The method according to claim 1,
   wherein the device conducts a cryptographic operation that uses the first and second random number sequences.

12. The method according to claim 1, wherein the device is a flash storage device.

13. The method according to claim 1, wherein the device includes a memory and a cryptographic module.

14. A device comprising:
   a Random Number Generator (RNG) circuit having a configuration which is externally modifiable;

a controller coupled to the RNG circuit, which is arranged to:

control the RNG circuit to generate a first random number sequence having a first measure of randomness according to a first summation whose argument includes a reciprocal of a first probability multiplied by a logarithm of the first probability;

modify the configuration of the RNG circuit; and control the RNG circuit to generate a second random number sequence having a second measure of randomness according to a second summation whose argument includes a reciprocal of a second probability multiplied by a logarithm of the second probability, which is no less than the first measure.

15. The device according to claim 14, wherein the RNG circuit comprises a digital ring oscillator having feedback taps that can be switched on and off.

16. The device according to claim 14, wherein the RNG circuit comprises a plurality of digital ring oscillators whose outputs are combined using a combination function.

17. The device according to claim 14, further comprising a flash storage device.

18. The device according to claim 14, further comprising a memory and a cryptographic module.

* * * * *